United States Patent [19]

Schmidt

[11] Patent Number: 4,496,228
[45] Date of Patent: Jan. 29, 1985

[54] CAMERA SUPPORT

[76] Inventor: John D. Schmidt, 1634 Ovwrbrook Dr., Englewood, Fla. 33533

[21] Appl. No.: 426,262

[22] Filed: Sep. 29, 1982

[51] Int. Cl.³ .............................................. G03B 17/00
[52] U.S. Cl. .................................. 354/293; 352/243; 248/161; 248/411; 248/412
[58] Field of Search .......................... 354/81, 82, 293; 248/161, 411, 412; 352/243

[56] References Cited

U.S. PATENT DOCUMENTS

| | | | |
|---|---|---|---|
| 2,806,416 | 9/1957 | Jones | 354/82 X |
| 3,269,681 | 8/1966 | Azim | 248/124 |
| 3,289,563 | 12/1963 | Kent | 354/293 |
| 3,533,583 | 10/1970 | Azim | 248/125 |
| 4,051,493 | 9/1977 | Nakagawa et al. | 354/293 X |
| 4,081,814 | 3/1978 | Bulland | 354/82 X |

Primary Examiner—L. T. Hix
Assistant Examiner—Della J. Rutledge
Attorney, Agent, or Firm—Hauke and Patalidis

[57] ABSTRACT

A camera support including an angle-shaped base is releasably mountable to an extendable telescopic tubular leg member. The angle-shaped base includes two legs and a tubular member fixed to each leg. The telescopic member has an upper slide section and a lower base section. The upper slide section being slidably disposed in one of the tubular members of the angular-shaped base. The lower base section is slotted longitudinally and grooved peripherally such that when a clamp is fitted into the grooves and actuated, the base is releasably secured in selected positions along the upper slide section. The base member may be manually arrested when the camera is in a first and a second picture taking attitude and the base member is slidably supported by upper slide section. In some instances the upper slide section may be removed from the lower base section and used independently.

16 Claims, 7 Drawing Figures

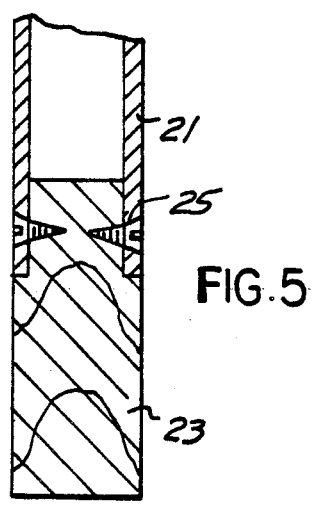
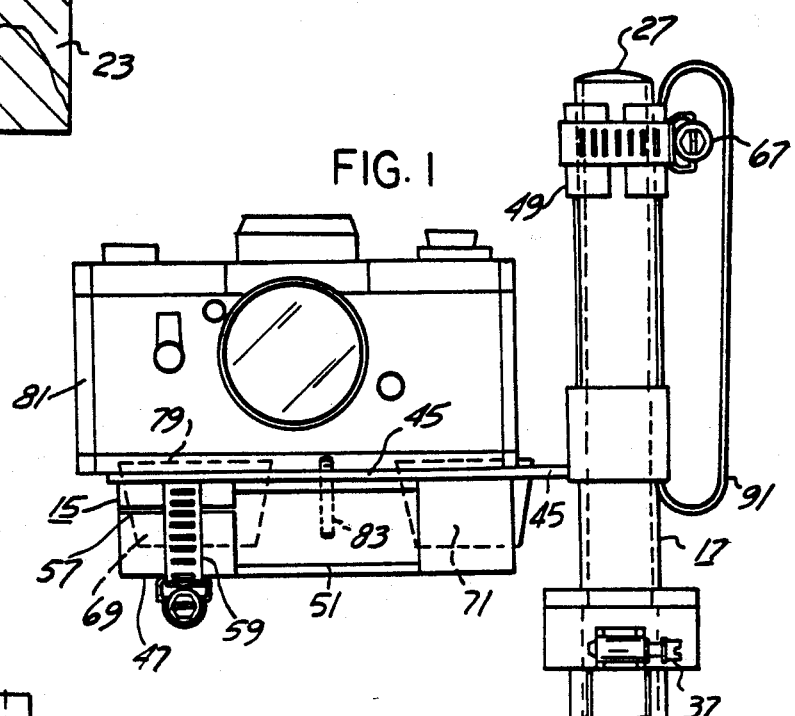
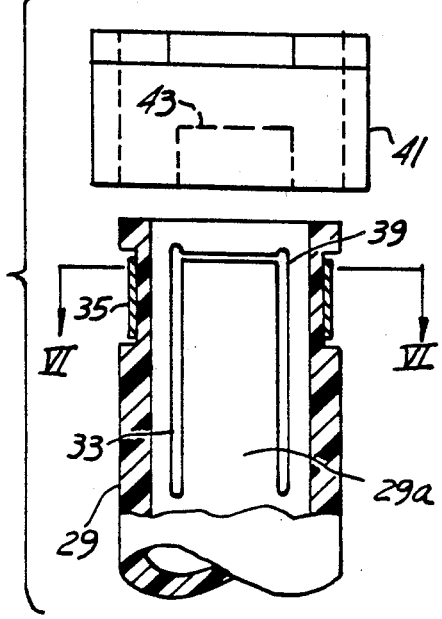
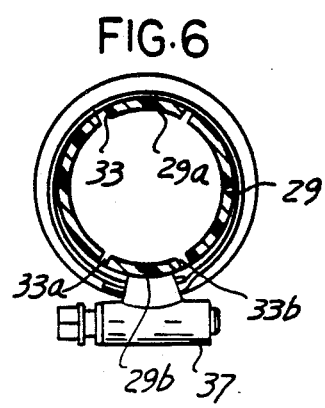
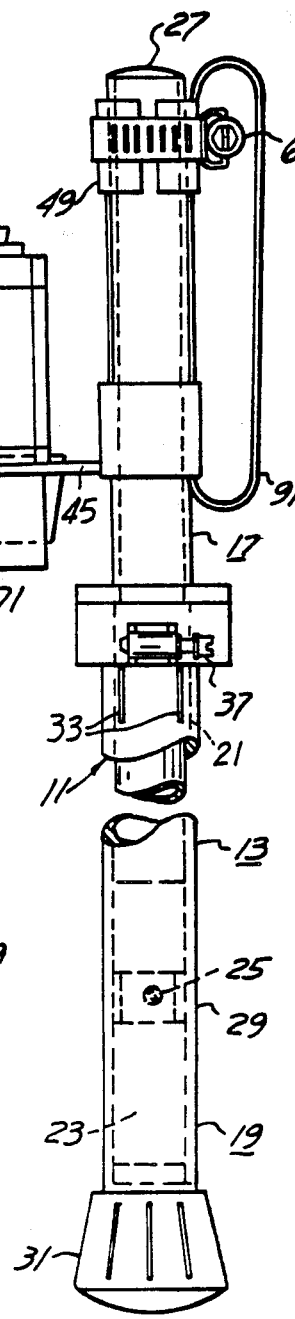

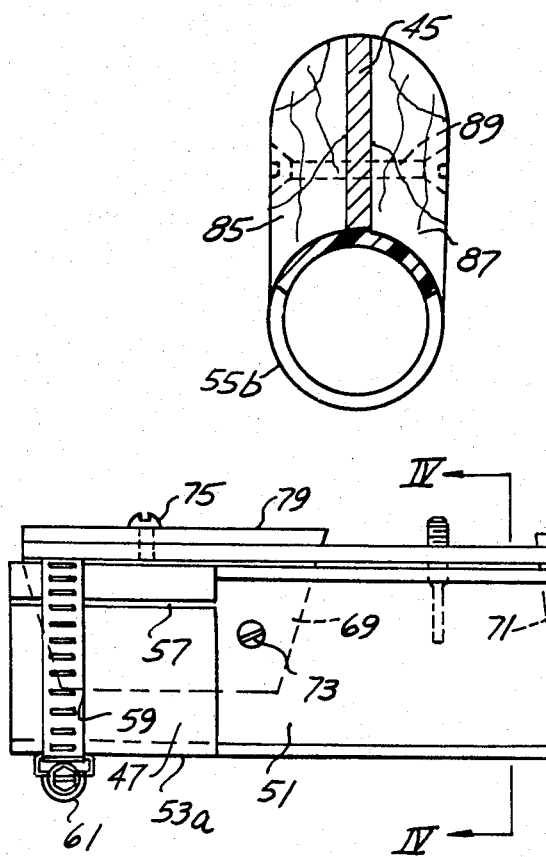
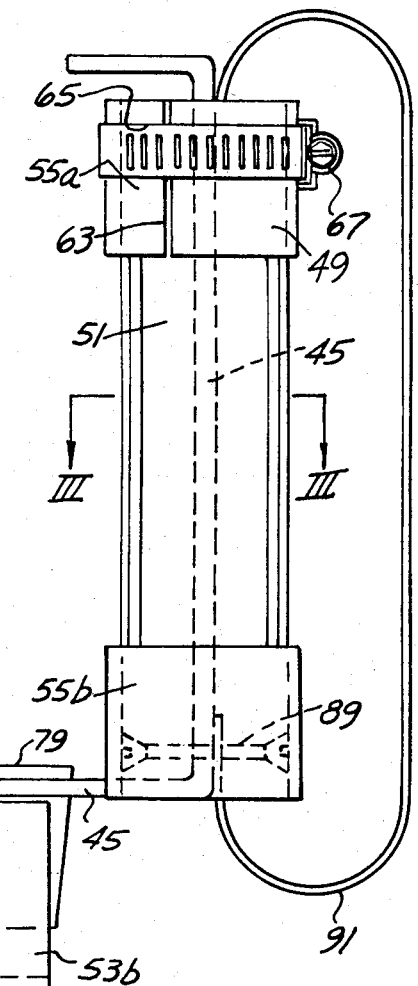
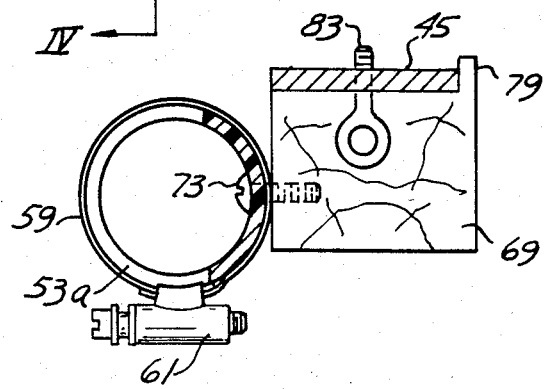

CAMERA SUPPORT

BACKGROUND OF THE INVENTION

The present invention relates generally to photography and, more particularly, to extensible supports for cameras.

For many years, photographers relied on a conventional three-legged tripod to support their cameras in the studio and in the field. That was when camera film was too slow to allow the use of fast shutter speeds, and also because the lenses used were not fast lenses as are available today. So, a rigid camera support was a requirement of every photographer and the tripod provided that support.

Today, however, with film speeds approaching ASA 1000, the cumbersome tripod is no longer necessary for supporting hand-held 35 mm cameras equipped with a fast lens. Yet, when a photographer uses a 35 mm camera equipped with a long telephoto or zoom lens of 35-200 mm, 50-300 mm, and 100-600 mm focal length, it becomes necessary to provide some support. Using a tripod in some instances is just not convenient where the subject matter moves rapidly and where a lens having macro capability is used.

Some camera supports known from the prior art have a neck strap and one or more rigid legs that join a camera support. Some other known camera supports include a single leg with a camera mount and a connection to a belt worn about the photographer's waist. Another form of camera support is a long telescopic tube and another form comprises a cart and step ladder.

Many other types of camera supports are known from the prior art, but when a photographer uses a camera fitted with a telephoto or zoom lens of the type mentioned previously, when photographing wild life such as animals and birds especially, a camera support of the type described and claimed herein has many features and advantages not available to a photographer using a camera support known from the prior art.

Camera supports known from the prior art are represented by: U.S. Pat. No. 2,703,691 to Minnis which discloses a camera support comprising a frame and a swingable camera post mounted adjacent one end of the frame. A leg member is telescopically extensible from the other end. An actuating arm is pivotably mounted to the post. Means is provided within the post, actuated by the lever portion, to hold the swingably camera post in a selected angular position relative to the frame; and United Kingdom Patent Specification No. 687,588 which discloses a supporting device for a camera comprising two parts; one part being formed by a telescoping support or tube provided with a clamping device for securing its element in a selected relative position, the other being formed by a handle provided with element members cooperating with an element of the support for being secured in a removable manner to the latter in at least two different positions. The handle also includes an element that cooperates with the camera for securing it to the handle; and U.S. Pat. No. 3,289,563 to Kent which discloses a support for a camera and a flash gun comprising a telescopic tubular support to which is adjustably mounted a bracket. The bracket is adapted to support a camera in an operative position and the bracket may be moved upwards or downwards on the tubular support or boom. The tubular support of boom also carries a support mount for the ordinary flash gun or strobe light.

In contrast to the aforementioned prior art, the present invention has many features and advantages thereover that will be apparent to one skilled in the art from the following description and the drawings.

SUMMARY OF THE INVENTION

A camera support in accordance with the present invention includes an angle-shaped base with means thereon for supporting a camera. The angle-shaped base is releasably mountable to an extendable telescopic tubular leg member with means for securing both the angle-shaped base and the extendable leg member in selectable positions.

For a further understanding of the invention and for features and advantages thereof, reference may be made to the following description and to the drawings.

BRIEF DESCRIPTION OF THE DRAWINGS

In the drawings:

FIG. 1 is a schematic view of a camera support apparatus in accordance with one embodiment of the invention;

FIG. 2 is a schematic view in elevation of the camera support bracket portion of the apparatus of FIG. 1;

FIG. 3 is a view along line III—III of FIG. 2;

FIG. 4 is a view along line IV—IV of FIG. 2;

FIG. 5 is a view of a portion of the apparatus of FIG. 1;

FIG. 6 is a view along line VI—VI of FIG. 7; and

FIG. 7 is a view of a portion of the lower end of the apparatus of FIG. 1.

DETAILED DESCRIPTION

Referring to FIG. 1, a camera support 11 in accordance with the present invention comprises two portions, the one being a telescoping shaft or leg 13 and the other a camera mounting bracket 15 releasably mounted to the telescoping shaft or leg 13.

The telescoping shaft or leg portion 13 includes an upper slide section 17 and a lower base section 19. The upper slide section 17 is an elongate member, preferably a hollow tubular tubular member 21 such as conventional PVC plastic pipe, but other materials such as aluminum may be used if desired. If preferred, the member 21 may be an elongate solid rod and need not be tubular at all. The lower end portion of the member 21, when tubular, is fitted with a wooden or plastic insert 23 which is held in place by means of conventional fasteners 25. The inset member 23 is made about 8 or 10 inches long for a purpose that will be disclosed hereinafter. The top end of the tubular member 21 is plugged as shown at 27 in FIG. 1 in any suitable manner.

The lower base section 19 is, preferably, a hollow tubular plastic member 29, to the bottom of which is fitted a conventional rubber cane tip 31. The upper end of the base section 19 is slotted longitudinally, FIG. 7, preferably in four places 33. The tubular plastic member 29 at the slotted end is also grooved peripherally, as at 35, to receive the band portion of a conventional screw-type hose clamp 37. Between the slots 33a and 33b, as shown in FIG. 6, the tubular member 29 is cut at the top of the groove 35, as at 39, thereby making each diametrically opposed portion of the plastic member 29a, 29b respectively, bendable inwardly toward the telescoping upper slide section 17, when it is inserted into the base section 19, and when pressure is applied to it by the screw-type clamp 37.

FIG. 7 also shows a collar 41 that is adapted to fit slidably down over the upper slotted end of the plastic member 29. A slot 43 in the collar 41 is provided to fit around a portion of the screw-type hose clamp 37.

Referring to FIGS. 1-4, a camera mounting bracket 15, in accordance with the invention includes an angle-shaped base member 45 to which is fitted guide tubes 47, 49. One tube 47 is fitted to one leg of the angle-shaped base member 45, and the other tube 49 is fitted to the other leg of the base member 45.

The guide tube members 47, 49 are each sized to slidably receive the upper slide section 17, as shown in FIG. 1. The shell of the guide tube 47 is partly cut away longitudinally, as at 51, thereby forming two short tubular portions 53a, 53b that remain connected together by the portion of the shell not cut away. In like manner, the shell of the guide tube 49 is partly cut away, as at 51, thereby forming two short guide tubular portions 55a, 55b, that are connected together by the shell portion not cut away.

The guide tubes 47, 49 are purposely cut away so as to provide finger contact with the upper slide section 17, when a photographer's hand and fingers grasp the mounting bracket 15. Thus, when the camera and the mounting bracket 15 are raised to a selected position on the upper slide section 17, finger contact with the slide section will hold the camera and bracket in that position long enough for a shot and then the camera and bracket can be positioned at a another place on the slide section 17.

In some instances, arresting means is provided to releasably secure the camera support bracket 15 in a desired position on the upper slide section 17. A preferred form of arresting means is described hereinafter.

As shown in FIG. 2, the tubular portion 53a is slotted, as at 57, and is grooved peripherally, as at 59, to receive the band of one type of arresting device, a screw-type hose clamp 61. In like manner, the tubular portion 55a is provided with a slot 63 and a peripheral groove 65 to receive the band portion of such a screw-type arresting device as the hose clamp 67.

As shown in FIGS. 2 and 4, the horizontal leg of the angle-shaped base member 45 is fitted with two shaped members 69, 71 that are connected to the tube member 47 by suitable fasteners 73. Each shaped member 69, 71 is also secured to the horizontal leg portion of the member 45 by means of suitable fasteners 75, 77 respectively. The members 69, 71 are made of wood in one embodiment of the invention, but they may be made of any other suitable material as desired. Each member 69, 71 is provided with an upstanding lip portion 79 that engages the back of a camera body 81 mounted on the bracket 15 to prevent the camera body from twisting around relative to the base member 45 once the camera is secured to the member 45 by a conventional mounting screw 83.

Referring now to FIG. 3, the upstanding leg of the angle-shaped base member 45 is fitted with a hand grip comprising two members 85, 87, shaped about as shown in FIG. 3. The two members 85, 87 are disposed one on each side of the upstanding leg of the base member 45. In one embodiment of the invention, the two members 85, 87 are made of wood, but each member may be made of other suitable materials as desired. The two members 87, 89 are fastened to the base leg by means of conventional fasteners 89. A leather or plastic strap, shaped as a loop 91, is also secured to the top and bottom end portions of the upstanding leg of the base 45, particularly to the shaped member 87 by means of the fasteners 89.

In use, a photographer first mounts the camera to the support bracket 15, threading the screw 83 into the conventional threaded hole in the bottom of the camera body. Then, after extending the upper slide section 17 to a desired length, the photographer mounts the bracket 15 on the upper slide section 17. Depending on whether the photographer wishes to take a vertical format picture or a horizontal picture, the photographer inserts the upper slide section 17 through the short tubes 53a, 53b for a vertical format picture, and through the short tubes 55a, 55b for a horizontal format picture as shown in FIG. 1.

The photographer slides his hand through the strap 91 and grasps the hand grip 85, 87, his fingers contacting the slide section 17. Then, the camera and the mounting bracket may be moved up or down on the slide section with the fingers exerting pressure on the slide section to hold the camera and bracket in any desired position on the slide section.

The bottom tip 31 may be set upon the ground or other support and the camera mounting bracket and the camera support 11 may be manipulated through an infinite number of angles relative to a vertical line through the tip contact point with the ground.

Arresting means is provided to releasably secure the mounting bracket on the slide section at any desired location in the form of the screw clamps 61 and 67. It is a simple matter to reposition the bracket by releasing the screw clamps and moving the camera and bracket to another position at which the screw clamps may be tightened again.

When the upper slide section is being extended, there is a danger that it may be extended too far and may be removed from the base section. To prevent this, the photographer is alerted to such danger when the wooden bottom section 23 of the upper slide section appears above the top of the base member 19. The upper slide section may then be extended only a few more inches, say eight or ten, as the case may be, depending on the length of the wooden section 23. Those skilled in the art will recognize that other types of indicia may be employed for this purpose.

In some instances, the upper slide section may be removed from the base section and used independently thereof. Such use is particularly handy when photographing things close to the ground or where the entire length of the camera support would be inconvenient.

In other instances, the upper slide section may be fully extended and the camera support bracket mounted thereon upside down. Then, by using conventional cable shutter release devices, a picture may be taken from above the photographer's head, the shutter being released from ground level.

From the foregoing description of one embodiment of the invention, those skilled in the art will recognize many features and advantages of it among which the following are significant.

That the camera support is mobile and is quickly adjustable to serve many types of photographers in the best possible mode;

That the camera support may be quickly and easily raised to any desired height within the limits of the telescopic sections to suit any photographer's needs;

That the camera support bracket may be hand-arrested in a desired position on the support and the bracket moved up or down thereon as required, it being held by the photographer's fingers in contact with the upper slide section;

That the camera support, when in contact with the ground, may be tilted through an infinite number of angles relative to a vertical line through the ground contact point;

That by positioning the camera bracket upside down on the extended slide section, a picture may be taken from an elevated position well above the photographer's head;

That when photographing things close to the ground, the upper slide section alone may be used as a camera support; and That the camera support of the present invention is simple to construct and is adaptable to many photographer's needs.

Although the foregoing describes one embodiment of the invention, it is understood that modifications may be made thereto without departing from the scope of the invention as set forth in the following claims.

What is claimed is:

1. A camera support comprising:
   (a) an angle-shaped base having two legs and having fixed to each leg thereof a tubular member;
   (b) an elongated member slidably disposed in one of said tubular members; and
   (c) means for positioning and holding said angle-shaped base in position on said elongate member.

2. The camera support of claim 1 wherein,
   (a) said elongate member includes,
      (i) a tubular first member and
      (ii) an elongate second member slidably disposed in said tubular first member, and
      (iii) means for positioning and holding said second member in selected lengthwise positions relative to said first member.

3. The camera supports of claim 2 wherein,
   (a) said means for holding said second member includes a clamp surrounding said tubular first member; and
   (b) means for actuating said clamp in such a way that said second member is frictionally held in selected positions within and without said tubular first member.

4. The camera support of claim 1 wherein,
   (a) said means for holding said angle-shaped base in selected positions includes a clamp surrounding said tubular member through which said elongate member is disposed; and
   (b) means for actuating said clamp in such a way that said elongate member is frictionally held in selected positions relative to said tubular member.

5. The camera support of claim 3 wherein,
   (a) said tubular first member is grooved at the top and slotted longitudinally whereby when said clamp is fitted in said groove and actuated, said slotted top portion of said first member bears frictionally on and holds said second member in selected positions relative to said first member.

6. The camera support of claim 4 wherein,
   (a) said tubular member is grooved and slotted longitudinally in such a way that when said clamp is fitted in said groove and actuated, the shell of said slotted tubular member deforms and bears against said elongate member and frictionally holds said angle-shaped base in selected positions relative to said elongate member.

7. A camera support comprising:
   (a) an angle-shaped base member having two legs;
   (b) means on one leg for supporting a camera thereon;
   (c) a tubular member fixed longitudinally to each one of said leg portions, each said tubular member being slotted longitudinally and grooved peripherally;
   (d) clamping means disposed in each peripheral groove;
   (e) an elongate member slidably disposed in one of said tubular members; and
   (f) means for actuating said clamping means of one tubular member in such a way that said base member is releasably secured to said elongate member at selected positions therealong.

8. The invention of claim 1 wherein,
   (a) a longitudinal portin of each tubular member is removed in such a manner that guide tubes are formed at the ends of each tubular member that are interconnected by a portion of the tubular member that is not removed.

9. A camera support comprising,
   (a) an angle-shaped member having two leg portions;
   (b) means on one leg portion for supporting a camera thereon;
   (c) a tubular member fixed longitudinally to each one of said leg portions with each tubular member having a longitudinal portion removed in such a manner that at the ends of each tubular member guide tubes are formed that are interconnected by the portion of said tubular member not removed;
   (d) a longitudinal slot in each guide tube adjacent the end of each leg member;
   (e) a peripheral groove in each guide tube that is slotted;
   (f) first clamping means in each peripheral groove for deforming said slotted guide tube;
   (g) a first elongate tubular member;
   (h) a second elongate tubular member having longitudinal slots in one end portion thereof;
   (i) a peripheral groove in the slotted end portion of said second tubular member;
   (j) means for inserting one end portion of said first elongate tubular member slidably into said second elongate tubular member with said slotted end portion being deformable against said first elongate tubular member;
   (k) second clamping means in said peripheral groove of said second elongate tubular member for deforming the slotted end portion into contact with said first elongate tubular member and securing said first elongate tubular member in selected positions relative to said second tubular member;
   (l) means for inserting the other end portion of said first elongate tubular member into said guide tubes fixed to one leg portion of said base member;
   (m) means for actuating said second clamping means for securing said first elongate tubular member is selected positions relative to said second elongate tubular member;
   (n) means for arresting said base member in selected poritions along said first elongate tubular member; and
   (o) means for actuating said first clamping means for securing said base member in selected positions along said first elongate tubular member.

10. The camera support of claim 9 wherein, (a) said first and second clamping means are screw clamps.

11. The camera support of claim 10 including,
(a) indicia means on one end portion of said elongate first member for indicating when said elongate first member is close to being entirely withdrawn from said elongate tubular second member.

12. The camera support of claim 9 including,
(a) a strap handle means fixed to one leg of said base member.

13. The camera support of claim 9 including,
(a) means for closing the other end portion of said elongate tubular first member.

14. A camera support comprising:
(a) a base member having means thereon for supporting a camera;
(b) a rod-like member;
(c) means for slidably supporting said base member in selected positions along said rod-like member, said rod-like member being passed through said base member;
(d) a tubular member telescopically receiving said rod-like member;
(e) means for securing said rod-like member in selected positions when extended relative to said tubular member;
(f) means for manually arresting said base member in selected positions along said rod-like member when said camera is in a first picture taking attitude and said base member is slidably supported by said rod-like member; and
(g) means for manually arresting said base member in selected positions along said rod-like member when said camera is in a second picture taking attitude and said base member is slidably supported by said rod-like member.

15. The camera support of claim 14 wherein said base member is angle-shaped and each leg thereof has means for slidably receiving said rod-like member.

16. The camera support of claim 14 including,
(a) means for securing said base member in selected positions along said rod-like member.

* * * * *